Nov. 17, 1953  N. B. WILLIAMSON  2,659,612
FOLDING BABY CART
Filed Oct. 28, 1950  2 Sheets-Sheet 1
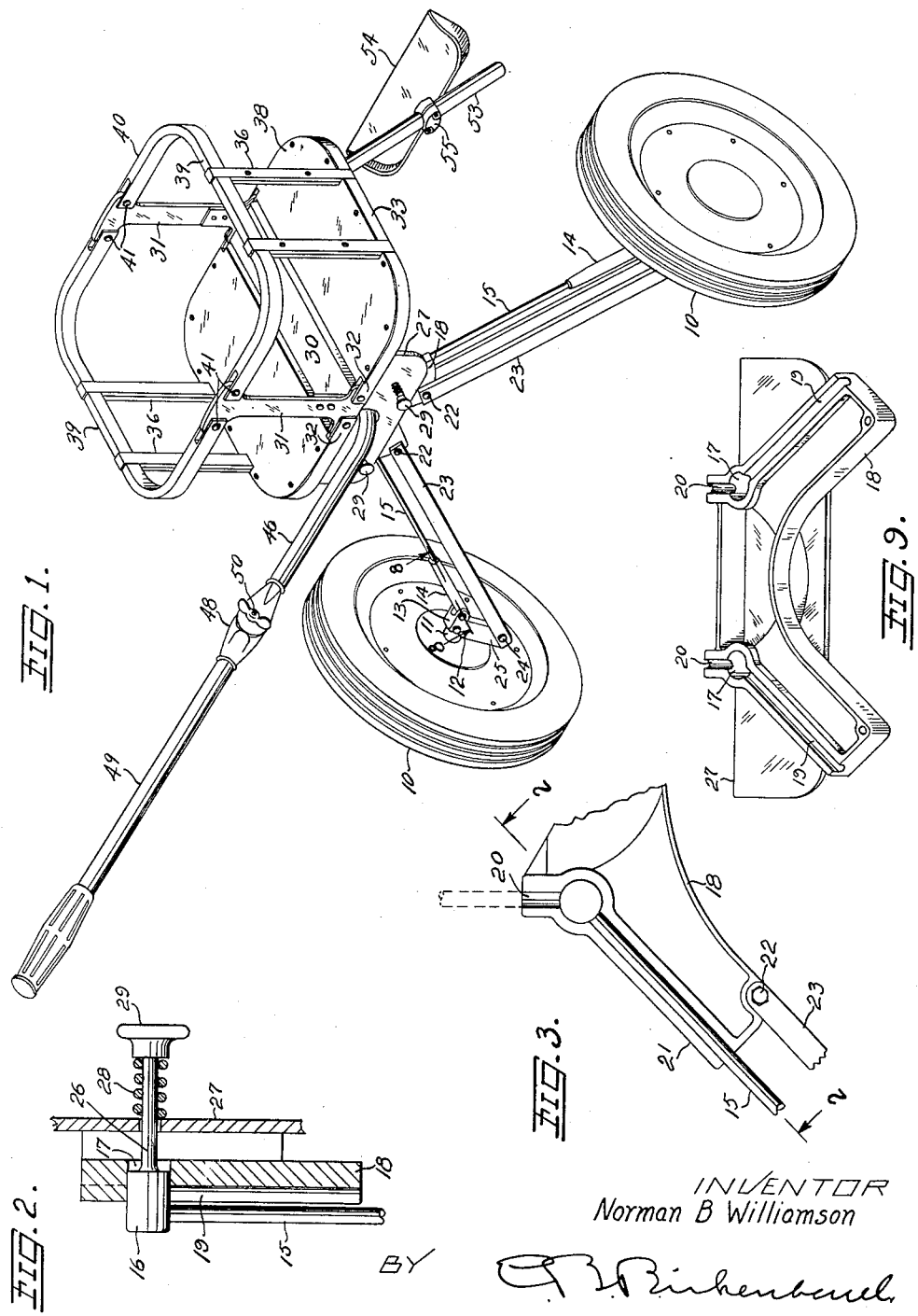
INVENTOR
Norman B Williamson
BY
ATTORNEY Nov. 17, 1953  N. B. WILLIAMSON  2,659,612
FOLDING BABY CART
Filed Oct. 28, 1950  2 Sheets-Sheet 2
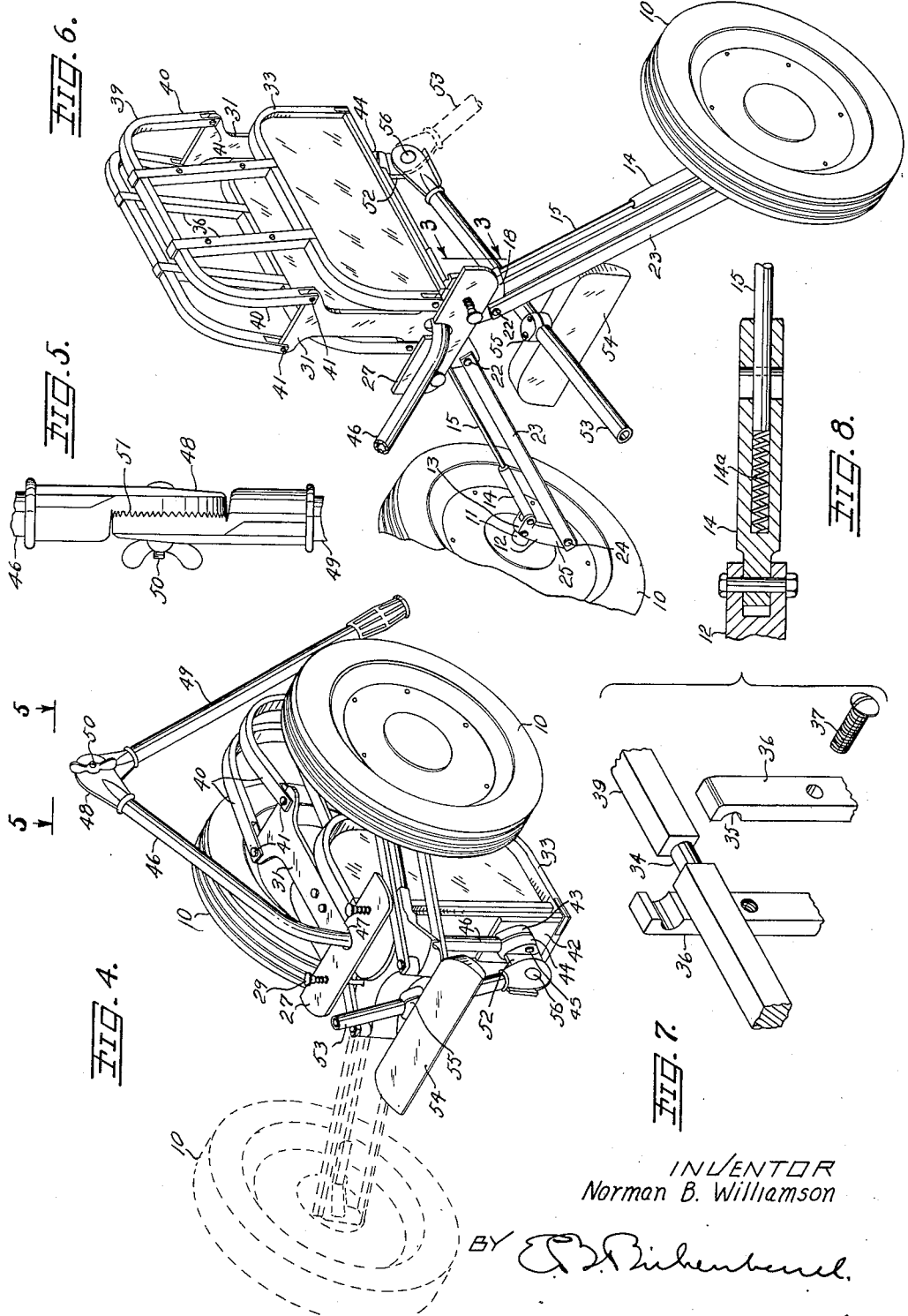
INVENTOR
Norman B. Williamson
ATTORNEY Patented Nov. 17, 1953

2,659,612

UNITED STATES PATENT OFFICE 2,659,612

FOLDING BABY CART

Norman B. Williamson, Portland, Oreg.

Application October 28, 1950, Serial No. 192,730

1 Claim. (Cl. 280—40)

This invention relates generally to vehicles and particularly to a folding baby cart.

The main object of this invention is to construct a folding cart for a child which will be sturdy in construction and capable of being extended or folded with ease by an inexperienced person.

I accomplish this and other objects in the manner set forth in the following specification as illustrated in the accompanying drawings, in which:

Fig. 1 is a perspective view of the cart showing it in an extended position.

Fig. 2 is a section taken along the line 2—2 in Fig. 3.

Fig. 3 is a side elevation of Fig 2 taken along the line 3—3 in Fig. 6.

Fig. 4 is a perspective view of the cart in a collapsed position showing in dotted lines one wheel in an extended position.

Fig. 5 is a partial plan taken along the line 5—5 in Fig. 4.

Fig. 6 is a perspective view of the cart with the seat folded.

Fig. 7 is an expanded view.

Fig. 8 is a section taken along the line 8—8 in Fig. 1.

Fig. 9 is a perspective view of the holding plate.

Like numbers of reference refer to the same or similar parts throughout the several views.

Referring in detail to the drawings, I have provided a pair of ground engaging wheels 10, preferably rubber tired. Each wheel 10 is provided with a short shaft 11 on the inner end of which is an L-shaped spindle arm 12, to the upper end 13 of which is attached a tube 14 containing a spring 14a in which is slidably mounted a rod 15 whose end 16 is rotatable in a hole 17 in the holding plate 18 which has a slot 19 which communicates with the hole 17 and receives the rod 15 in an extended position and holds it rigidly in position.

The plate 18 also has slots 20 which hold the rods 15 in a folded or retracted position. The plate 18 has projecting arms 21 which contain the rods 15. Each arm 21 has hinged thereto, by means of a bolt 22, a pair of links 23 whose outer ends are hinged by a bolt 24 to the long end 25 of the L-shaped arm 12.

Extending from the end 16 is a stem 26 which projects through the plate 27 and carries a spring 28 which is held in compression by the button nut 29. Pressure on a nut 29 will push the rod 15 out of the slot 19 and permit the attached wheel 10 to swing to a retracted position, as shown in Fig 4; that is, with the rod 15 in the slot 20.

Extending rigidly from the plate 27 is a center seat plate 30 from the ends of which extend the posts 31. To the feet of the post 31 are hinged the ends 32 of the flat bottom rail 33 in which are formed the round portions 34 which journal in the half round grooves 35 formed between the ends of the two-piece spindles 36, each of which has its portions joined by the screws 37.

A seat portion 38 covers each rail 33. A top rail 39 has its ends 40 hinged by means of the rivets 41 to the upper ends of the posts 31. The top rail 39, like the bottom rail 33, has rounded portions 34 which journal in the upper ends of the spindles 36.

It may be seen in Fig. 6 that the seat portions 38 can be folded upwardly when not in use.

Under the rear end of the center seat plate 30 is a base 42 to which a pair of clamping jaws 43 and 44 are held by the screws 45. The jaws 43 and 44 hold the bent tubular tongue 46 which extends through the slot 47 in the plate 27 and is connected by the clamping hinge 48 to the rubber tipped handle 49. The hinge 48 is provided with a wing nut clamping bolt 50 and has radial teeth 51 on the adjacent faces thereof.

The clamp portion 44 has a bent post 52 extending therefrom to which is hinged the tubular foot rest arm 53 on which is mounted a foot rest 54 which can be held in any desired position by means of the clamp 55. The arm 53 can be swung to the positions shown in full and dotted lines in Fig. 6. The arm 53 may be held in any desired position by means of the clamping bolt 56.

From the foregoing it can be seen that there is provided a child's cart which is sturdy in construction, easy riding, and easily extended or folded for storage or carrying purposes.

To extend or fold the cart, it is only necessary to press on each button 29 which releases its rod 15 from the slot 19 or 20 and permits the wheel 10 to be swung up or down as the case may be.

I claim:

A child's cart having in combination a seat composed of a fixed central portion and a pair of outer portions hinged to opposite sides of said central portions, a post at each end of the central portion, a pair of rails hinged to the top of said posts and extending around the edge of said seat and spaced therefrom, spindles hinged to said rail and seat adapted to permit said rail and seat to fold in unison, a plate attached to the central seat portion, said plate having a pair of stems extending slidably therethrough, said plate having a central and an inclined slot formed therein radiating from the stem, a spring on said stem, a parallel pair of links hinged to said central seat portion, springs for urging one link of each pair to one slot at each stem, and handle means for manipulating said cart.

NORMAN B. WILLIAMSON.

References Cited in the file of this patent

UNITED STATES PATENTS

| Number | Name | Date |
|---|---|---|
| 458,736 | Martin | Sept. 1, 1891 |
| 2,523,893 | Williamson | Sept. 26, 1950 |